Figure 1:
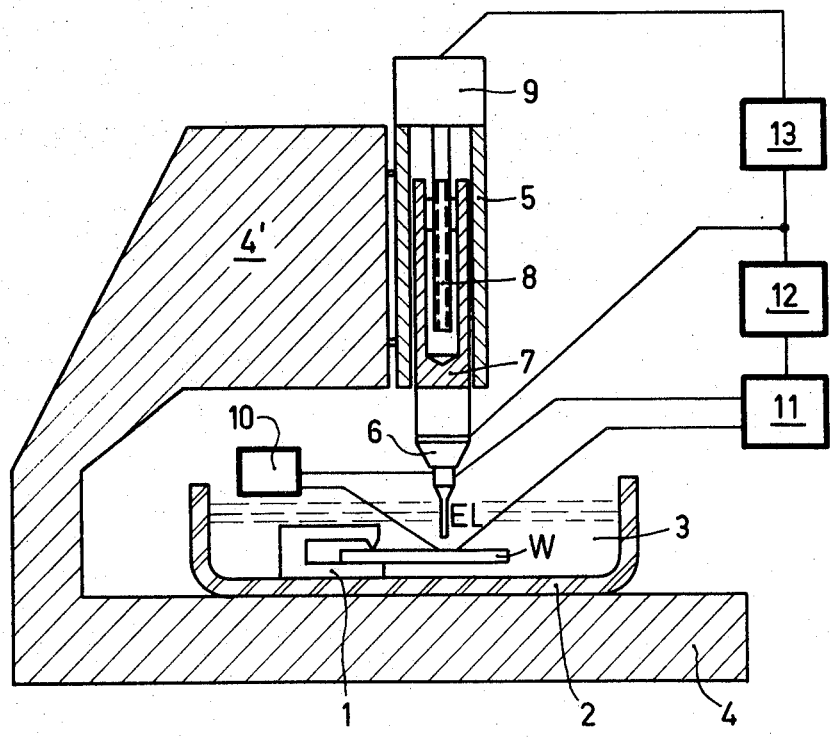

United States Patent [19]
De Jongh et al.

[11] 3,758,739
[45] Sept. 11, 1973

[54] APPARATUS FOR REMOVING MATERIAL FROM AN ELECTRICALLY CONDUCTING WORKPIECE

[75] Inventors: Job Harm De Jongh; Johannes Josephus Aloisius Cornelus Maenhout; Cornelis Van Osenbruggen, all of Emmasingel, Eindhoven, Netherlands

[73] Assignee: U.S. Philips Corporation, New York, N.Y.

[22] Filed: Oct. 10, 1972

[21] Appl. No.: 295,946

[30] Foreign Application Priority Data
Oct. 13, 1971   Netherlands.......................7114048

[52] U.S. Cl.......... 219/69 G, 204/143 M, 219/69 V
[51] Int. Cl............................. B23p 1/04, B23p 1/14

[58] Field of Search......................... 219/69 G, 69 V; 204/143 M

[56] References Cited
UNITED STATES PATENTS
3,335,313   8/1967   Luimes et al. ................. 219/69 G X
3,610,865   10/1971   Van Osenbruggen ........ 219/69 G X

*Primary Examiner*—R. F. Staubly
*Attorney*—Frank R. Trifari

[57] ABSTRACT

Spark erosion machine including an electrode holder driven by a motor. A control element in the form of an electromechanical transducer is arranged within the electrode holder, permitting fast fine control of the electrode movement.

4 Claims, 2 Drawing Figures

APPARATUS FOR REMOVING MATERIAL FROM AN ELECTRICALLY CONDUCTING WORKPIECE

The invention relates to an apparatus for removing material from an electrically conducting workpiece by means of spark erosion in which sparks are produced between the workpiece and an electrode, which apparatus includes an electrode holder driven by a motor. Such an apparatus is described in "Philips Technical Review," 30 No. 6/7, pages 195–208 (1969). The "high-speed spark machine" described on page 202 of this paper has the advantage that the repetition frequency of the spark discharges in the spark gap, i.e., the space between the work piece and the electrode, is high, permitting the spark machining rate to be high also. In the known apparatus a stepping motor is controlled by the breakdown voltage across the spark gap. The stepping motor may drive the electrode holder, for example, via a lead screw. After each spark discharge the electrode holder is displaced a small distance.

The known apparatus using discontinuous electrode displacement is not suitable for very fine machining operations. Driving the electrode by means of a stepping motor cannot be used to form very small holes in a workpiece, which operation requires the use of a small spark energy and a correspondingly narrow spark gap, because the discrete stepped displacement is greater than the desired spark gap.

It is an object of the invention to provide an apparatus of the type described at the beginning of this specification which not only works fast but also is suitable to perform very fine operations. The apparatus according to the invention is characterized in that the electrode holder includes a control element for the electrode in the form of an electromechanical transducer which similarly to the motor is controlled by a signal derived from the condition of the spark gap. The electromechanical transducer ensures very fast fine control, the electrode being spaced from the workpiece by a distance which is favourable for the spark machining process. At a given signal strength a motor, for example a stepping motor, is turned on so that the electrode holder is moved a given distance. During the step displacement the electrode is held at the required distance from the workpiece by the fast electromechanical control.

The invention is not restricted to a spark erosion machine using a stepping motor. An electromechanical transducer may also be used to produce fine control of th electrode displacement when the electrode is driven by means of a servomotor.

Preferably the control element is a piezoelectric element which is clamped at both ends and comprises a plurality of plates made of a piezo-electric material which are provided with electrically conducting coatings and are arranged one above the other in the direction of the electrode movement.

It should be noted that the use of piezo-electric elements in spark erosion machines is known. For example, on pages 204 to 206 of "Philips Technical Review," 30 No. 6/7 (1969) there is described a spark erosion machine in which the electrode is vibrated by means of a piezo-electric element. In this machine, however, the piezo-electric element is clamped at one end. This element is a bending element and comprises a metal plate which is clamped between two plates of a piezo-electric material. The latter two plates are provided with electrically conducting coatings. The mechanical stiffness of the known device is small, so that the control frequency is comparatively low. The device according to the invention has a large mechanical stiffness and a control frequency which is an order of magnitude higher than that of the known apparatus. In the known apparatus the piezo-electric element is directly controlled by the voltage across the spark gap, whereas in the apparatus according to the invention the control element is controlled by a signal obtained by comparing the current flowing, and/or the voltage applied, across the spark gap with reference values.

In the apparatus according to the invention a hydraulic amplitude amplifier is preferably provided between the control element and the electrode. This enables the amplitude of the control signal to be considerably reduced.

Figure 2:
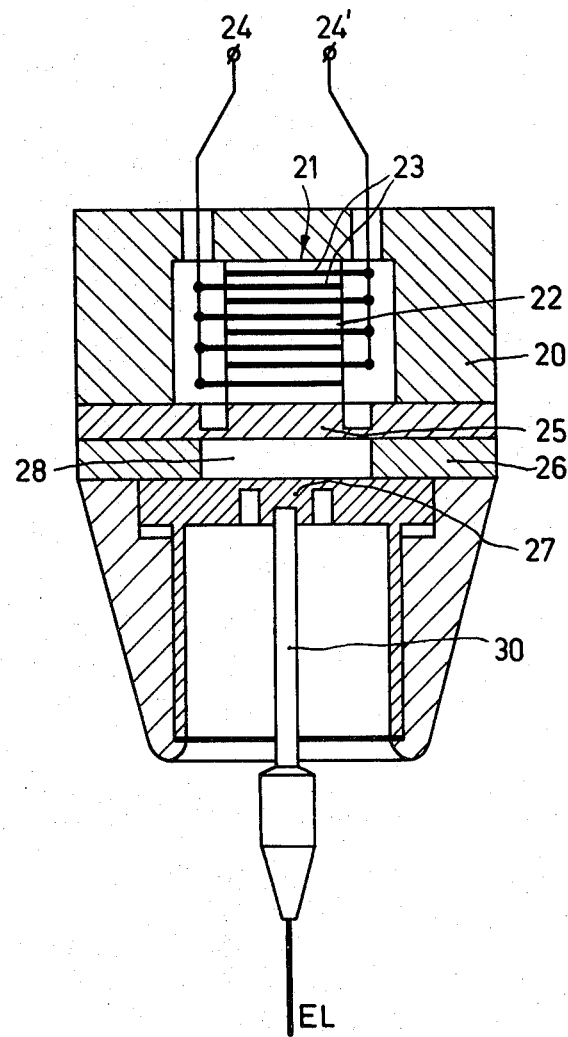

An embodiment of the invention will now be described, by way of example, with reference to the accompanying diagrammatic drawings, in which:

FIG. 1 shows schematically a preferred embodiment of an apparatus according to the invention and FIG. 2 shows in more detail the electrode holder used in this apparatus.

In the apparatus shown in FIG. 1 a workpiece W is held by a mount 1. The workpiece is placed in a tank 2 containing a dielectric rinsing liquid 3. The tank 2 is placed on a worktable 4. A work electrode EL is secured in an electrode holder 6 which in turn is rigidly connected to a movable column 7. The column 7 can be raised and lowered by means of a lead screw 8 driven by a stepping motor 9 within a guide column 5 connected to a column 4' of the worktable.

Sparks between the electrode and the workpiece are produced by means of a pulse generator 10 which supplies well defined rectangular current pulses.

The displacement of the electrode EL is to be controlled in accordance with the progress of the machining process. For this purpose a device 11 is provided which measures the condition of the spark gap and converts the measurement into a control voltage, preferably a direct voltage. As will be set out more fully hereinafter, the device 11 may be based on various principles. The control voltage at the output of the device 11 is applied via a voltage amplifier 12 to a control element, for example a piezo-electric element, in the electrode holder 6.

FIG. 2 shows this electrode holder. A housing 20 contains a piezo-electric control element 21 which comprises a plurality of plates 22 made of a ceramic material which has a given bias polarisation. The plates 22 are separated by electrically conducting coatings 23 which are alternately connected to terminals 24 and 24'. The bias polarisation of the plates 22 will be reduced in accordance with the voltage applied to the terminals 24 and 24', causing the element 21 to be deflected to a greater or lesser extent, so that the electrode EL also is given a voltage-dependent displacement.

As soon as the voltage across the piezo-electric element exceeds a given value, there is applied via a level detector 13, which is indicated in FIG. 1 and may include a differential amplifier, a signal to the stepping motor, causing it to displace the electrode holder a given distance. The piezo-electric control is so fast as to enable the distance between the electrode and the workpiece to be adjusted within the duration of the step displacement of the motor.

In a spark machining process three conditions can be distinguished:

a. The desired condition in which material is removed from the workpiece. During this condition there is a given voltage, the breakdown voltage, at which a spark is struck between the workpiece and the electrode. After a breakdown a current flows across the spark gap.

b. The condition in which, although there is a voltage across the spark gap, no current flows.

c. The short-circuit condition, during which a large current flows but no voltage is set up between the workpiece and the electrode.

In the two latter conditions no material is removed and the electrode is to be displaced, in the case b towards the workpiece and in the case c away from the workpiece.

Because each of the aforementioned conditions is characterized by the presence or absence of current flowing and voltage applied across the spark gap or by the value of this current or voltage, measuring at least one of these values and comparing the or each meausred value with a relevant reference value enables a control voltage to be produced which gives an indication of the condition of the spark gap.

For example, the breakdown voltage between the electrode and the workpiece may be measured, the average of the breakdown voltage being compared with a reference direct voltage. The electrode can then be controlled by means of the difference between the average breakdown voltage and the reference voltage.

A more accurate method is the so-called efficiency determination in which both the current flowing and the voltage applied across the discharge space are measured and processed in a logic circuit. Such a method is described in the paper: "Entlade- und Abtragvorgange sowie Vorschubregelung bei der Elektroerosion" ("Discharge and removal processes and feed control in electro-erosion") by W. Weigand in "Industrie-Anzeiger," 30 (1969), No. 42, pages 41–44.

The piezo-electric control element may also have the shape of a hollow cylinder. The electrically conducting coatings then are provided on the inner and outer walls of the cylinder. The axial deflection per unit of field strength of such a piezo-electric cylinder is small. However, the cylinder wall may be thin, permitting a high field strength to be obtained with a not too high control voltage.

The aforedescribed apparatus employing a piezo-electric control element is only one embodiment of an apparatus according to the invention. The control element may be any electromechanical transducer, provided that it is fast enough and gives the desired deflection. For example, the piezo-electric control element of FIG. 1 may be replaced by a magnetostrictive element which is controlled by a current derived from the condition of the spark gap.

The control element (FIG. 2) may be directly connected to the rod 30 and the electrode EL. For such a construction comparatively large control signals (for example control voltages up to 1,500 volts) are required to displace the electrode through the desired distances. Especially the amplification of direct voltages to such values may give rise to difficulty. To avoid large control signals the electrode holder may be provided with a hydraulic amplitude amplifier as shown in FIG. 2.

The electrode holder includes two diaphragms 25 and 27 having different surface areas. A container 26 filled with an incompressible liquid 28 is interposed between the diaphragms. The deflection of the piezo-electric element 21 is transmitted to the diaphragm 25. The displacement of this diaphragm is transmitted by the liquid to the disphragm 27. The ratio between the surface areas of the diaphragms 25 and 27 determines the amplification factor of the amplitude of the deflection of the electrode. The control voltage required for the piezo-electric element may be reduced by the same factor. In a practical embodiment of an apparatus according to the invention provided with a piezo-electirc control element the step displacement of the stepping motor was 1.25 $\mu$m. This displacement was achieved in 1 millisecond. The maximum control voltage for the piezo-electric element was 500 volts, and the amplification factor of the hydraulic amplifier was 10. At 1,000 Hertz the impedance of the piezo-electric element was 16 kOhms. The control element comprised 10 plates of diameter 10 mm and thickness 1 mm. The plates were made of a ceramic piezo-electric oxide.

What is claimed is:

1. Apparatus for removing material from an electrically conducting workpiece by means of spark erosion, in which sparks are produced between the workpiece and an electrode, which apparatus includes an electrode holder driven by a motor, characterized in that the electrode holder includes a control element for the electrode in the form of an electromechanical transducer which similarly to the motor is controlled by signal derived from the condition of the spark gap.

2. Apparatus as claimed in claim 1, characterized in that the control element is a piezo-electric control element which is clamped at both ends and comprises a plurality of plates made of a piezo-electric material which are provided with electrically conducting coatings and are arranged one above the other in the direction of the electrode movement.

3. Apparatus as claimed in claim 2, characterized in that a hydraulic amplitude amplifier is provided in the electrode holder between the control element and the electrode.

4. Apparatus as claimed in claim 1, characterized in that a hydraulic amplitude amplifier is provided in the electrode holder between the control element and the electrode.

* * * * *

PO-1050
(5/69)

UNITED STATES PATENT OFFICE
CERTIFICATE OF CORRECTION

Patent No. 3758739  Dated Sept. 24, 1973

Inventor(s) JOB HARM DE JONGH ET AL

It is certified that error appears in the above-identified patent and that said Letters Patent are hereby corrected as shown below:

Column 1, line 7, ", which" should read --.The--

Column 3, line 24, delete "the or"

Claim 1, line 4, "which apparatus includes" should read --comprising-- lines 5 & 6, "characterized in that the" should read --said-- line 6, "includes" should read --including--

Claim 2, lines 1 & 2, "characterized in that" should read --wherein--

Claim 3, lines 1 & 2, "characterized in that" should read --further comprising-- line 2, delete [is]

UNITED STATES PATENT OFFICE
CERTIFICATE OF CORRECTION

Patent No. 3758739      Dated Sept. 24, 1973

Inventor(s) JOB HARM DE JONGH ET AL

It is certified that error appears in the above-identified patent and that said Letters Patent are hereby corrected as shown below:

- page 2 -

Insert:

--Claim 5, An apparatus for removing material from an electrically conducting workpiece by means of spark erosion in which sparks are produced between the workpiece and an electrode, comprising an electrode holder, a motor for driving said holder, an electrode carried by said electrode holder, and an electromechanical tranducer for controlling said electrode said transducer being controlled by a signal derived from the condition of the spark gap.--

Signed and sealed this 25th day of December 1973.

EAL)
test;

WARD M. FLETCHER, JR.
testing Officer

RENE D. TEGTMEYER
Acting Commissioner of Patents